United States Patent
Zhang et al.

(10) Patent No.: US 8,090,270 B2
(45) Date of Patent: Jan. 3, 2012

(54) FREQUENCY OFFSET POLARIZATION MULTIPLEXING MODULATION FORMAT AND SYSTEM INCORPORATING THE SAME

(75) Inventors: Hongbin Zhang, Marlboro, NJ (US);
Carl R. Davidson, Warren, NJ (US)

(73) Assignee: Tyco Electronics Subsea Communications LLC, Morristown, NJ (US)

( * ) Notice: Subject to any disclaimer, the term of this patent is extended or adjusted under 35 U.S.C. 154(b) by 705 days.

(21) Appl. No.: 12/187,084

(22) Filed: Aug. 6, 2008

(65) Prior Publication Data

US 2010/0034537 A1    Feb. 11, 2010

(51) Int. Cl.
- *H04B 10/06* (2006.01)
- *H04B 10/12* (2006.01)
- *H04B 10/04* (2006.01)

(52) U.S. Cl. .................... 398/188; 398/201; 398/212

(58) Field of Classification Search .............. 398/147, 398/158, 159, 162, 183, 185, 192, 193
See application file for complete search history.

(56) References Cited

U.S. PATENT DOCUMENTS

| | | | |
|---|---|---|---|
| 6,342,961 | B1 | 1/2002 | Bergano et al. |
| 7,333,732 | B2 | 2/2008 | Domagala |
| 2004/0114939 | A1* | 6/2004 | Taylor ................ 398/152 |
| 2004/0161245 | A1 | 8/2004 | Bergano |
| 2007/0206960 | A1* | 9/2007 | Nissov et al. ........... 398/188 |
| 2008/0025733 | A1* | 1/2008 | Nazarathy et al. ........ 398/209 |

OTHER PUBLICATIONS

Van Den Borne, et al., "A comparison between Multi-Level Modulation Formats: 21.4-Gbit/s RZ-DQPSK and POLMUX-RZ-DPSK," Conference Paper—Optical Fiber Communication Conference (OFC), Anaheim, California, Mar. 5, 2006; Advanced Modulation Format (OThR).

Van Den Borne, et al., "Inter-channel Depolarization Impairments in 21.4-Gbit/s POLMUX OOK and DPSK Transmission," IEEE/LEOS Benelux Chapter 2005. (pp. 133-136). Mons, Belgium.

Cai, et al., "40 Gb/s Transmission Using Polarization Division Multiplexing (PDM) RZ-DBPSK with Automatic Polarization Tracking," Conference Paper—National Fiber Optic Engineers Conference (NFOEC). San Diego, California, Feb. 24, 2008.

Mollenauer, et al., "Polazrization Scattering by Soliton-Soliton Collisions," Opt. Lett. 20, 2060-2062 (1995).

International Search Report and Written Opinion dated Sep. 30, 2009 issued in related International Patent Application No. PCT/US2009/052967.

* cited by examiner

*Primary Examiner* — Leslie Pascal
(74) *Attorney, Agent, or Firm* — Grossman, Tucker, Perreault & Pfleger, PLLC

(57) ABSTRACT

An apparatus, system and method wherein a polarization multiplexed differential phase shift keying format (POLMUX-DPSK) is provided with offset and bit-interleaved frequency channels and demodulated using a DPSK demodulator.

25 Claims, 5 Drawing Sheets

FREQUENCY OFFSET POLARIZATION MULTIPLEXING MODULATION FORMAT AND SYSTEM INCORPORATING THE SAME

TECHNICAL FIELD

The present application relates to the optical transmission of information and more particularly, to a frequency offset polarization multiplexing modulation format and system incorporating the same.

BACKGROUND

Known long-haul systems have been implemented using binary modulation formats wherein a single data bit is modulated on a single transmitted symbol. One method of performing binary modulation is known as On-Off-Keying (OOK), wherein the transmitted pulse is turned on and off with the ones and zeros of a data bit stream. On-Off-Keying may be implemented in a variety of well-known formats, such as Return-to-Zero (RZ), Non-Return to Zero (NRZ) and Chirped-Return-to-Zero (CRZ) formats. Generally, in a RZ format the transmitted optical pulses do not occupy the entire bit period and return to zero between adjacent bits, whereas in a NRZ format the optical pulses have a constant value characteristic when consecutive binary ones are sent. In a chirped format, such as CRZ, a bit synchronous sinusoidal phase modulation is imparted to the transmitted pulses.

Phase Shift Keying (PSK) is another binary modulation method known to those of ordinary skill in the art. In PSK modulation ones and zeros are identified by phase differences or transitions in the optical carrier. PSK may be implemented by turning the transmitter on with a first phase to indicate a one and then with a second phase to indicate a zero. In a differential phase-shift-keying (DPSK) format, the optical intensity of the signal may be held constant, while ones and zeros are indicated by differential phase transitions. DPSK modulation formats include RZ-DPSK, wherein a return-to-zero amplitude modulation is imparted to a DPSK signal, and CRZ-DPSK.

When the bit rate of a transmission system is increased, e.g. to 40 Gb/s, transmission penalties may become more pronounced. For higher bit rates, multi-level modulation formats have been attractive due to their high spectral efficiency and increased tolerance to chromatic dispersion and polarization mode dispersion compared with the same line rate as binary modulation formats. In a multi-level modulation format multiple data bits may be encoded on a single transmitted symbol.

A number of multi-level modulation formats are known. Examples of multi-level modulation formats useful for encoding two-bits per symbol include: quadrature phase shift keying (QPSK); differential quadrature phase shift keying (DQPSK) wherein information is encoded in four differential phases; and a combination of amplitude shift keying and differential binary phase shift keying (ASK-DBPSK). Multi-level modulation formats with eight symbol levels useful for encoding three bits per symbol include differential 8-level phase shift keying (D8PSK) and ASK-DQPSK. A combination of quadrature amplitude shift keying and differential quadrature phase modulation (QASK-DQPSK) may be used to provide 16 symbol levels, or four bits per symbol.

Two types of multi-level modulation formats that have been considered for 40 Gb/s long-haul optical transmission systems are return-to-zero differential quadrature phase shift keying (RZ-DQPSK) and polarization multiplexing (POL-MUX) RZ-DPSK, which involves sending a pair of 20 Gb/s signals at orthogonal polarizations. Both of these formats achieve 2 bits/symbol modulation.

It has been found that that 40 Gb/s POLMUX-RZ-DPSK outperforms 40 Gb/s RZ-DQPSK by ~4 dB in a 5,200 km Raman assisted EDFA system with 150 Km repeater spacing and 66.6 GHz channel spacing mainly due to higher nonlinear phase noise tolerance and sensitivity. Unfortunately, however, POLMUX-RZ-DPSK requires a receiver including a polarization controller to track the input random state of polarization for each channel and a polarizer to suppress the orthogonal neighboring channel. Any loss of polarization control may result in a degradation of Q-factor in a POLMUX-RZ-DPSK system.

BRIEF DESCRIPTION OF THE DRAWINGS

Reference should be made to the following detailed description which should be read in conjunction with the following figures, wherein like numerals represent like parts.

DETAILED DESCRIPTION

In general, a system consistent with the present disclosure implements a variation of a POLMUX-DPSK modulation format without use of a receiver including a polarization controller to track the input random state of polarization for each channel and a polarizer to suppress the orthogonal neighboring channel. In one exemplary embodiment, two RZ-DPSK modulated signals having orthogonal polarizations relative to each other are combined. The two signals have an optical carrier frequency difference of approximately an odd-number of one-quarter of the bit-rate of the respective signals. With this constraint a DPSK demodulator effectively removes the crosstalk power from the neighboring channel. To optimize performance, a variable delay may be used to adjust the optical pulses between the two channels so that they are bit-interleaved.

Figure 1:
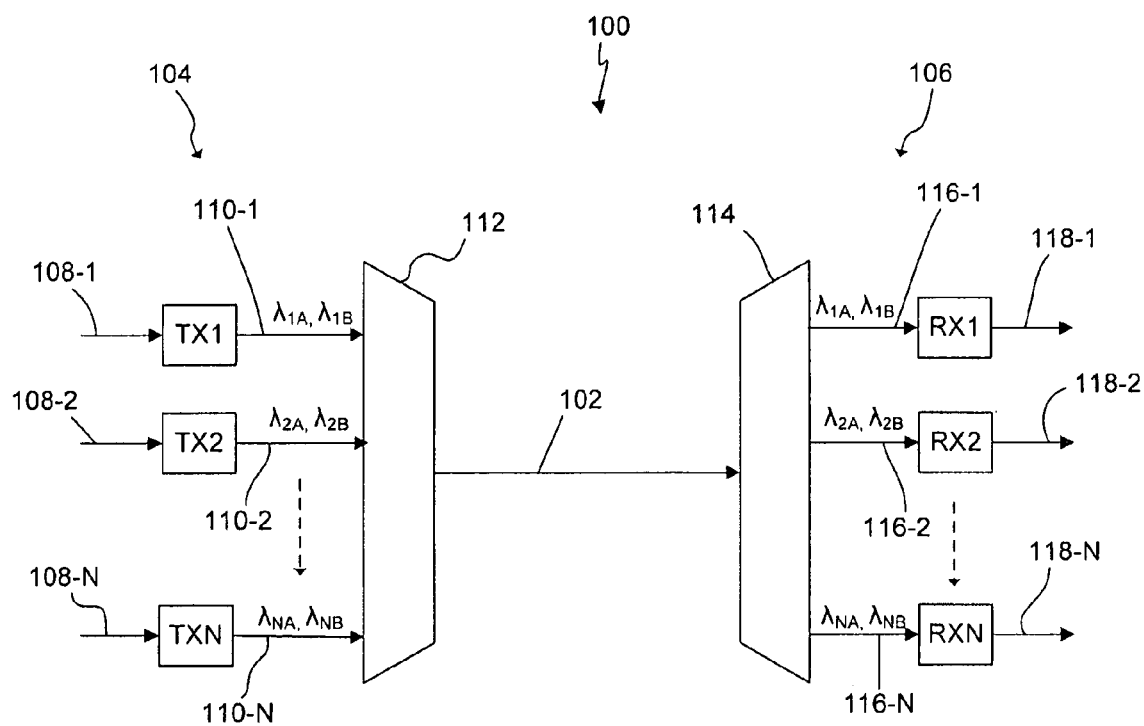
FIG. 1 is a simplified block diagram of one exemplary embodiment of a system consistent with the present disclosure.

FIG. 1 is a simplified block diagram of one exemplary embodiment of a WDM transmission system 100 consistent with the present disclosure. The transmission system serves to transmit a plurality of optical channels over an optical information path 102 from a transmitting terminal 104 to one or more remotely located receiving terminals 106. The exemplary system 100 may be a long-haul submarine system configured for transmitting the channels from a transmitter to a receiver at a distance of 5,000 km, or more.

Those skilled in the art will recognize that the system 100 has been depicted as a highly simplified point-to-point system for ease of explanation. For example, the transmitting terminal 104 and receiving terminal 106 may, of course, both be configured as transceivers, whereby each may be configured to perform both transmitting and receiving functions. For ease of explanation, however, the terminals are depicted and described herein with respect to only a transmitting or receiving function. It is to be understood that a system and method consistent with the disclosure may be incorporated into a wide variety of network components and configurations. The illustrated exemplary embodiments herein are provided only by way of explanation, not of limitation.

In the illustrated exemplary embodiment, each of a plurality of transmitters TX1, TX2 . . . TXN receives a data signal having a first data rate on an associated input port 108-1, 108-2 . . . 108-N. Consistent with the present disclosure one or more of the transmitters TX1, TX2 . . . TXN may transmit a pair of orthogonally polarized signals on associated optical carrier wavelengths, $\lambda_{1A}$ and $\lambda_{1B}$, $\lambda_{2A}$ and $\lambda_{2B}$ . . . $\lambda_{NA}$ and $\lambda_{NB}$. The carrier wavelengths of each pair may be frequency separated by about one-quarter of the bit rate of the signals, as described in greater detail herein. Data may be modulated on the wavelengths $\lambda_{1A}$ and $\lambda_{1B}$, $\lambda_{2A}$ and $\lambda_{2B}$ . . . . $\lambda_{NA}$ at half of the first data rate in a known fashion using a DPSK modulation format, e.g. a RZ-DPSK or CRZ-DPSK format, and the signals modulated on the pairs of wavelengths $\lambda_{1A}$ and $\lambda_{1B}$, $\lambda_{2A}$ and $\lambda_{2B}$ . . . $\lambda_{NA}$ and $\lambda_{NB}$ may be bit-interleaved.

For example, for a 40 Gb/s input signal at port 108-N, the transmitter TXN may time-division demultiplex the input signal into a pair of 20 Gb/s signals. The transmitter TXN may modulate a first one of the pair of 20 Gb/s signals using a RZ-DPSK format on a wavelength $\lambda_{NA}$ and a second one of the pair of 20 Gb/s optical signals using a RZ-DPSK format on a wavelength $\lambda_{NB}$. The signal on $\lambda_{NA}$ may be orthogonally polarized relative to signal modulated on $\lambda_{NB}$, and the optical carrier frequency of $\lambda_{NA}$ may be separated from the optical carrier frequency of $\lambda_{NB}$ by approximately an odd number of one-quarter of the bit rate, e.g. ¼, ¾, 5⁄4. etc. of the signal on $\lambda_{NA}$ and $\lambda_{NB}$. To optimize performance, the orthogonally polarized signals on wavelengths $\lambda_{1A}$ and $\lambda_{1B}$, $\lambda_{2A}$ and $\lambda_{2B}$ . . . $\lambda_{NA}$ and $\lambda_{NB}$ may be bit-interleaved. The transmitters, of course, are shown in highly simplified form for ease of explanation. Those skilled in the art will recognize that each transmitter may include electrical and optical components configured for transmitting the data signal at its associated wavelength with a desired amplitude and modulation.

The transmitted wavelengths or channels are respectively carried on a plurality of paths 110-1, 110-2 . . . 110-N. The data channels are combined into an aggregate signal on optical path 102 by a multiplexer or combiner 112. The optical path 102 may include optical fiber waveguides, optical amplifiers, optical filters, dispersion compensating modules, and other active and passive components.

The aggregate signal may be received at one or more remote receiving terminals 106. A demultiplexer 114 separates the transmitted channels at wavelengths $\lambda_{1A}$ and $\lambda_{1B}$, $\lambda_{2A}$ and $\lambda_{2B}$ . . . $\lambda_{NA}$ and $\lambda_{NB}$ onto associated paths 116-1, 116-2 . . . 116-N coupled to associated receivers RX1, RX2 . . . RXN. One or more of the receivers RX1, RX2 . . . RXN may be configured to demodulate the transmitted signal and provide an associated output data signal at the first data rate on an associated output path 118-1, 118-2 . . . 118-N. The term "coupled" as used herein refers to any connection, coupling, link or the like by which signals carried by one system element are imparted to the "coupled" element. Such "coupled" devices are not necessarily directly connected to one another and may be separated by intermediate components or devices that may manipulate or modify such signals.

Figure 2:
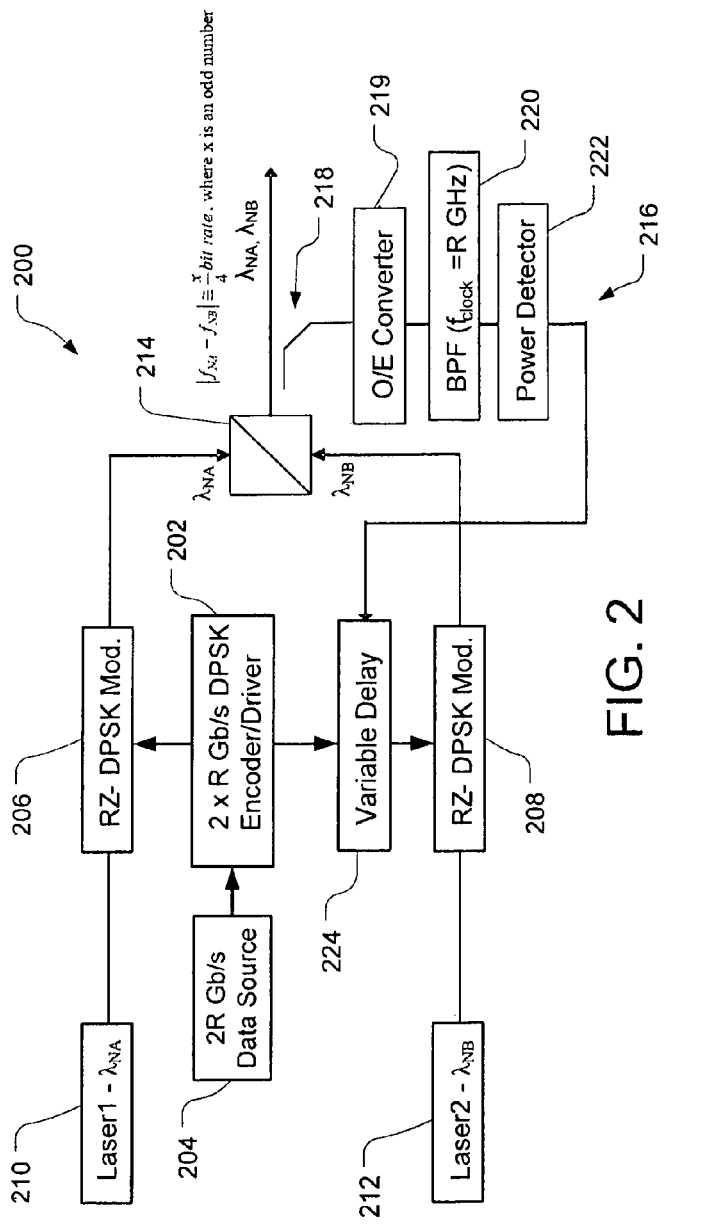
FIG. 2 shows a simplified block diagram of one exemplary embodiment of a transmitter consistent with the present disclosure.

FIG. 2 is a simplified block diagram of one exemplary transmitter 200 consistent with the present disclosure. For simplicity and ease of explanation, the illustrated exemplary embodiment is described in connection with a specific modulation format, i.e. RZ-DPSK, bit rate and arrangement of modulators. It is to be understood, however, that the exemplary embodiments described herein are presented by way of illustration, not of limitation. A system consistent with the present disclosure may be implemented using any DPSK modulation format, bit rate and/or arrangement of modulators.

The illustrated exemplary embodiment 200 includes a 2×R Gb/s DPSK Encoder/Driver 202 that receives an R Gb/s data signal from an R Gb/s data source 204. For ease of explanation, the embodiment 200 will be described herein with respect to the Encoder/Driver 202 configured as a 2×20 Gb/s DPSK Encoder Driver and the data source 204 configured as a 40 Gb/s Data source 204. It is to be understood, however, that R may represent any data rate.

In a known fashion, the DPSK Encoder/Driver 204 may time-division multiplex a 40 Gb/s data signal from the data source 204 into two separate 20 Gb/s data signals and provide DPSK-encoded versions of the separate 20 Gb/s signals to first 206 and second 208 DPSK modulators. The DPSK modulators 206, 208 may be configured for encoding the 20 Gb/s signals onto an optical signal in a known fashion using a DPSK format. In one embodiment, for example, the DPSK modulators may be configured to impart an RZ-DPSK modulation as described in U.S. Patent Publication No. 2004/0161245 by Neal S. Bergano entitled "Synchronous amplitude modulation for improved performance of optical transmission systems," the teachings of which are fully incorporated herein by reference.

The illustrated exemplary embodiment 200 further includes a first laser 210 for producing a continuous wave (CW) optical signal having wavelength $\lambda_{NA}$ and corresponding frequency $f_{NA}$. The optical signal may be coupled to the first DPSK modulator 206 for encoding one of the 20 Gb/s data signals onto the optical signal using a DPSK modulation format, e.g. an RZ-DPSK modulation format, producing a modulated optical information signal on carrier wavelength $\lambda_{NA}$. A second laser 212 may be provided for producing a continuous wave (CW) optical signal having wavelength $\lambda_{NB}$ and corresponding frequency $f_{NB}$. The optical signal may be coupled to the second DPSK modulator 208 for encoding the other of the 20 Gb/s data signals onto the optical signal using a DPSK modulation format, e.g. an RZ-DPSK modulation format, producing a modulated optical information signal on carrier wavelength $\lambda_{NB}$.

The outputs of the modulators are coupled to respective inputs of a known polarization combiner 214. The polarization combiner 214 multiplexes the modulator outputs into an aggregate signal and polarizes the outputs so that they are relatively orthogonally polarized, i.e. the signal modulated on wavelength $\lambda_{NA}$ is orthogonally polarized relative to the signal modulated on wavelength $\lambda_{NB}$. One of ordinary skill in the art will recognize that the functionality of the polarization combiner may be accomplished using, for example, a conventional directional coupler in which the states of polarizations of the inputs are carefully adjusted.

In the illustrated exemplary embodiment, bit interleaving of the signals on $\lambda_{NA}$ and $\lambda_{NB}$ is accomplished using a feedback path 216 including a coupler 218, a known optical-to-electrical (O/E) converter 219, an electrical band pass filter 220 and a RF power detector 222. The coupler may take a known configuration for coupling a portion, e.g. 10%, of the polarizer output to O/E converter 219. The O/E converter 219 may convert the coupler output into an electrical signal in a known fashion and provide the electrical signal as an output to the electrical band pass filter 220. The electrical band pass filter 220 may take a known configuration having a center frequency equal to the clock frequency of the signals modulated on $\lambda_{NA}$ and $\lambda_{NB}$, e.g. 20 GHz in an embodiment where the data source provides a 40 Gb/s data signal. The output of the band pass filter 220 may be coupled to the power detector 222. The RF power detector may also take a known configuration for detecting the optical power at the center frequency of the band pass filter. The output of the power detector 222 is provided to a variable delay element 224.

The delay element 224 may be coupled between the encoder/driver 202 and the modulator 208 for imparting a variable delay to the pulses modulated onto the wavelength $\lambda_{NB}$ by the modulator 208. The variable delay may be imparted in response to the output of the power detector 222 for adjusting the relative timing between the optical pulses modulated $\lambda_{NA}$ and $\lambda_{NB}$ so that they are bit-interleaved. In general, if the optical pulses modulated on $\lambda_{NA}$ and $\lambda_{NB}$ are perfectly aligned the power detector 222 would detect maximum optical power at the clock frequency. In one embodiment, therefore, the power detector 222 may provide a feedback signal to the delay element 224 configured to minimize the optical power at the clock frequency, thereby achieving bit-interleaving.

Figure 3:
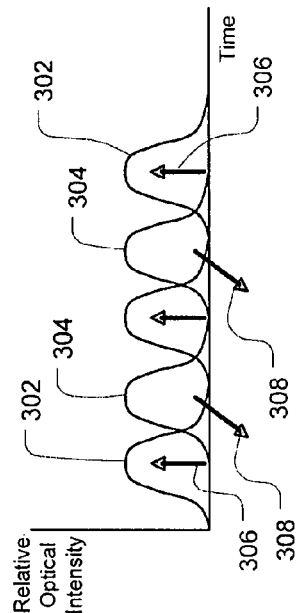
FIG. 3 shows waveforms associated with one exemplary embodiment of a transmitter consistent with the present disclosure.

With reference to FIG. 3, for example, there are provided plots 302 and 304 of relative optical power vs. time for exemplary RZ-DPSK signals modulated on $\lambda_{NA}$ and $\lambda_{NB}$, respectively. Arrows 306 diagrammatically illustrate the direction of polarization of the signal modulated on $\lambda_{NA}$ and arrows 308 diagrammatically illustrate the direction of polarization of the signal modulated on $\lambda_{NB}$. As shown, the signals on $\lambda_{NA}$ and NB are relatively orthogonally polarized. In addition, the optical pulses on $\lambda_{NA}$ and $\lambda_{NB}$ are bit-interleaved, i.e. the optical pulses on $\lambda_{NA}$ generally occupy the space between pulses on $\lambda_{NB}$, and vice-versa. Again, the optical carrier frequencies $f_{NA}$ and $f_{NB}$ associated with on $\lambda_{NA}$ and $\lambda_{NB}$, respectively, differ by approximately an odd-number of one-quarter of the bit rate, within some tolerance as will be described in detail below. The relationship between $f_{NA}$ and $f_{NB}$ may be expressed as follows:

$$|f_{NA} - f_{NB}| \cong \frac{x}{4}\text{bit rate, where } x \text{ is odd number} \quad (1)$$

It should be noted however that the absolute value of the frequency difference between $f_{NA}$ and $f_{NB}$ should be small enough to avoid interference with neighboring channels, i.e. $\lambda_{(N+1)A}$ and $\lambda_{(N+1)B}$ and $\lambda_{(N11)A}$ and $\lambda_{(N-1)B}$ in the aggregate WDM signal.

Figure 4:
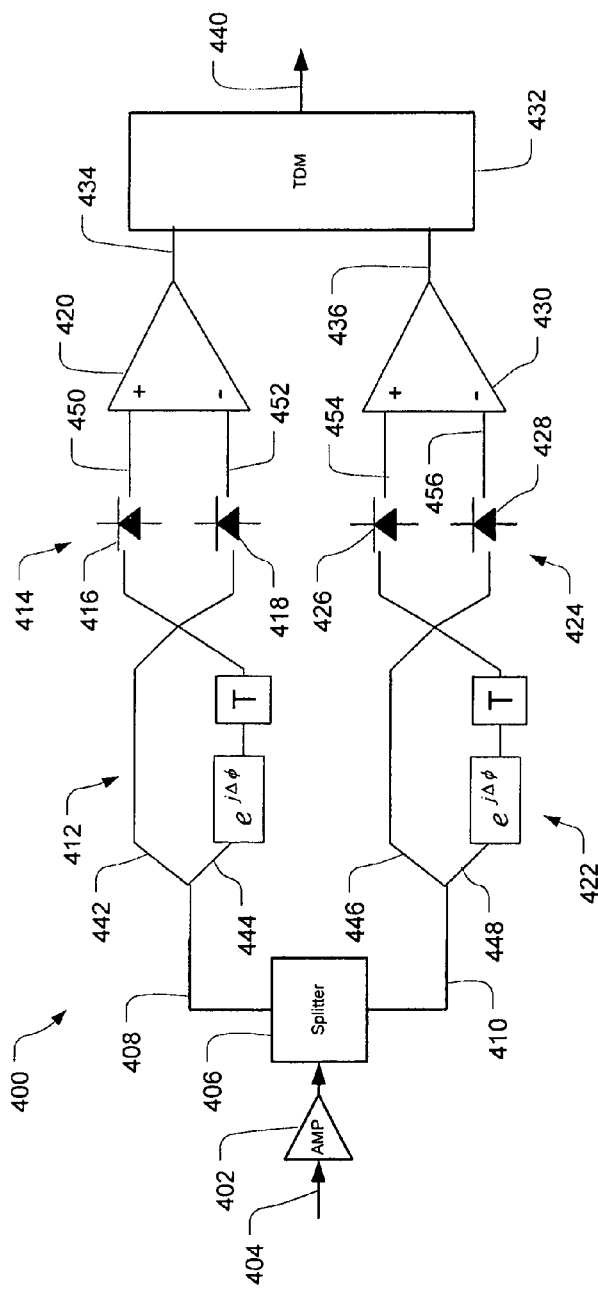
FIG. 4 shows a simplified block diagram of one exemplary embodiment of a receiver consistent with the present disclosure.

Turning to FIG. 4, there is illustrated an exemplary receiver 400 consistent with the present disclosure. The illustrated exemplary embodiment includes an amplifier 402, e.g. an erbium doped fiber amplifier (EDFA) for receiving and amplifying a DPSK modulated optical signal provided on path 404, a known splitter 406 for splitting the output of the amplifier 402 onto first 408 and second 410 paths. A first known DPSK demodulator 412 is coupled to the first path 408, and a first dual balanced detector 414 configuration including first 416 and second 418 photodetectors is coupled to the output of the first DPSK demodulator 412. A first differential amplifier 420 is coupled to the output of the balanced detector 414. A second known DPSK demodulator 422 is coupled to the second path 410 and a second dual balanced detector configuration 424 including first 426 and second 428 photodetectors is coupled to the output of the second DPSK demodulator 422. A second differential amplifier 430 is coupled to the output of the second DPSK demodulator 422. A time-division multiplexer 432 is coupled to the outputs of the differential amplifiers 420, 430, respectively. The time-division multiplexer interleaves the data at the inputs thereof to provide an electrical output on path 440 representative of the input provided on path 404.

Those of ordinary skill in the art will recognize that the illustrated receiver is depicted in simplified diagrammatic form for ease of explanation. Other components, such a band pass filter at the input, clock and data recovery (CDR) circuits at the outputs of the balanced detectors, feedback paths for controlling the operating characteristics of the demodulators, etc. may be incorporated into a receiver consistent with the present disclosure. In one embodiment, for example, each of the DPSK demodulators may be configured as described in U.S. Pat. No. 7,333,732 by Jerzy Domagala entitled "Optical Receiver," the teachings of which are fully incorporated herein by reference.

The DPSK demodulators 412, 422 may each include a known interferometer, such as a Mach-Zehnder interferometer, configured to split light onto two separate optical paths/arms 442, 444, and 446, 448, respectively, one of which may have an optical path length 1-data bit longer than the other, and recombine the light interferometrically. FIG. 4 diagrammatically illustrates the transfer function associated with the path 444, 448 of each DPSK demodulator having the longer path length. The respective paths may be configured to impart a desired time-delay component T, as well as a desired phase delay component, $e^{j\Delta\phi}$, compared to the signal on the other path 442, 446 of the associated demodulator.

Figure 4A:
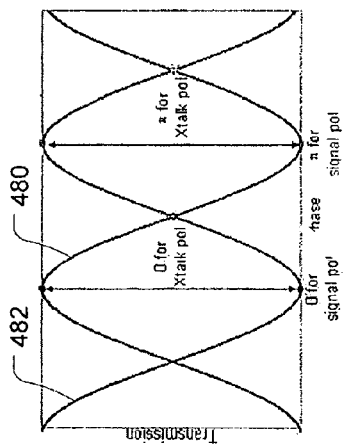
FIG. 4A includes plots of relative optical power vs. phase offset at the constructive and destructive ports of a modulator consistent with the present disclosure.

In a receiver consistent with the present disclosure, since $\lambda_{NA}$ and $\lambda_{NB}$ are separated by a frequency difference of approximately an odd-number of one-quarter of the bit rate, one of the demodulators 412, 422 may be optimized for demodulating the signal on $\lambda_{NA}$ while blocking the signal on $\lambda_{NB}$, and the other of the demodulators may be optimized for demodulating the signal on $\lambda_{NB}$ while blocking the signal on $\lambda_{NA}$. In particular, the phase delay component of each demodulator 412, 422 is dependent on a phase offset $\Delta\phi$ which may be expressed as:

$$\Delta\phi = 2\pi\Delta f/FSR \quad (2)$$

where $\Delta f$ is the center frequency shift of the DPSK demodulator relative to the input signal, and FSR is the free spectral range of the demodulator. If the center frequency of the DPSK demodulator 412 is set to the frequency associated with $\lambda_{NA}$ (i.e. $\Delta f=0$), then $\Delta\phi=0$ for the signal modulated on with $\lambda_{NA}$. With $\Delta\phi=0$ for the signal on $\lambda_{NA}$ and the time-delay component, T, set to provide a 1-bit delay compared to the signal on the other path 442 of the same demodulator 412, the light from one output of the demodulator (constructive arm) represents digital "ones" intensity modulated on $\lambda_{NA}$, and the light from the other output (destructive arm) represents digital "zeros" intensity modulated on $\lambda_{NA}$ if the phase difference between two neighboring bits modulated on $\lambda_{NA}$ is zero and vice-versa if the phase difference between two neighboring bits modulated on $\lambda_{NA}$ is 180 degrees. FIG. 4A, for example, includes plots 480, 482 illustrating the relative transmission function for outputs of the demodulators 412 and 422. Plot 480 illustrates the optical transmission function (i.e., relative power vs. optical phase offset $\Delta\phi$) at the constructive port of the demodulators and plot 482 illustrates optical transmission function at the destructive port. As shown, when the center frequency of the DPSK demodulator 412 is tuned to $\lambda_{NA}$, the signals at the output ports of the demodulator have different values representative of the ones and zeros modulated on the on $\lambda_{NA}$. The optical outputs of the DPSK demodulator 412 are imparted on the first 416 and second 418 photodetectors, which provide associated electrical outputs, e.g. on paths 450, 452 to the differential amplifier 420. The output of the differential amplifier 420 therefore includes ones and negative ones depending on the modulated phase difference on $\lambda_{NA}$.

However, since the frequency associated with $\lambda_{NB}$, is offset from the frequency of $\lambda_{NA}$ by, for example, one-quarter of the bit rate (where the bit rate is equivalent to the FSR of the demodulator), $\Delta f = \frac{1}{4}$ FSR for the signal modulated on $\lambda_{NB}$. Replacing $\Delta f = \frac{1}{4}$ FSR into equation (2) above, gives $\Delta\phi = \pi/2$ for the signal modulated on $\lambda_{NB}$, which means that the there is no coherent beating between the optical signal modulated on $\lambda_{NB}$ and its one-bit delayed signal at both the constructive port and destructive port of the demodulator, as illustrated in FIG. 4A ("Xtalk po1"). With this phase offset, in response to the signal modulated on $\lambda_{NB}$ equal photo currents are provided at the outputs 450, 452 of the balanced detector 414 and are cancelled out by the differential amplifier 420. The output of the differential amplifier 420 on path 434 therefore represents only the ones and zeros modulated on with $\lambda_{NA}$ and the signal modulated on $\lambda_{NB}$ is effectively cancelled without use of a polarization controller or polarizer.

Likewise, if the center frequency of the other DPSK demodulator 422 is set to the frequency associated with $\lambda_{NB}$ (i.e. $\Delta f = 0$), then $\Delta\phi = 0$ for the signal modulated on with $\lambda_{NB}$. With $\Delta\phi = 0$ for the signal on $\lambda_{NB}$ and the time-delay, T, component set to provide a 1-bit delay compared to the signal on the other path 446 of the same demodulator 422, the light from one output of the demodulator (constructive arm) represents digital "ones" intensity modulated on $\lambda_{NB}$, and the light from the other output (destructive arm) represents digital "zeros" intensity modulated on $\lambda_{NB}$ if the phase difference between two neighboring bits modulated on $\lambda_{NB}$ is zero and vice-versa if the phase difference between two neighboring bits modulated on $\lambda_{NB}$ is 180 degree as shown in FIG. 4A The optical outputs of the DPSK demodulator 422 are imparted to the first 426 and second 428 photodetectors, which provide associated electrical outputs, e.g. on paths 454, 456 to the differential amplifier 430. The output of the differential amplifier 430 on path 436 therefore includes the ones and zeros modulated on $\lambda_{NB}$.

Since the frequency associated with $\lambda_{NA}$, is offset from the frequency of $\lambda_{NB}$ by, for example, $\frac{1}{4}$ of the bit rate (where the bit rate is equivalent to the FSR of the demodulator), $\Delta f = \frac{1}{4}$ FSR for the signal modulated on $\lambda_{NA}$. Replacing $\Delta f = \frac{1}{4}$ FSR into equation (2) above, gives $\Delta\phi = \pi/2$ for channel the signal modulated on $\lambda_{NA}$, which means that the there is no coherent beating between the optical signal modulated on $\lambda_{NA}$ and its one-bit delayed signal at both the constructive port and destructive port of the demodulator, as illustrated in FIG. 4A ("Xtalk pol"). With this phase offset, in response to the signal modulated on $\lambda_{NA}$ equal photo currents are provided at the outputs 454, 456 of the balanced detector and are cancelled out by the differential amplifier. The output of the differential amplifier 430 on path 436 therefore represents only the ones and zeros modulated on $\lambda_{NB}$ and the signal modulated on $\lambda_{NA}$ is effectively cancelled without use of a polarization controller or polarizer.

The outputs of the DPSK demodulators 420, 430 are coupled to the inputs of the time-division multiplexer 432. The time-division multiplexer 432 may interleave the DPSK demodulator outputs to provide an aggregate electrical output on path 440 representative of the input received on path 404. In an embodiment wherein the transmitter is configured as illustrated in FIG. 2, for example, the aggregate output may represent the data provided by the 40 Gb/s data source 204.

Thus, when the spacing between signals modulated on $\lambda_{NA}$ and $\lambda_{NB}$ is approximately equal to an odd number of one-quarter of the FSR of the DPSK demodulator, i.e. the bit rate of the signals modulated on $\lambda_{NA}$ and $\lambda_{NB}$, then a DPSK demodulator followed by a differential amplifier can be used to remove one of the signals. In a system consistent with the present disclosure, coherent beating noise and neighboring signal beating noise may be addressed by polarization multiplexing and bit-interleaving, respectively. In particular, since the signals are orthogonally polarized coherent beating terms between them are minimized or eliminated. In contrast, any misalignment of the polarization controller or polarizer relative to the incoming signals in a conventional POLMUX configuration could cause coherent beating impairments. Neighboring signal ASE beating noise could generate a 3 dB Q-penalty since the neighboring signal has almost the same amplitude as the measured signal. Bit-interleaving the signals modulated on $\lambda_{NA}$ and $\lambda_{NB}$ reduces penalties from additional neighboring signal ASE beating noise by separating the neighboring-ASE noise from the sampling time.

Figure 5:
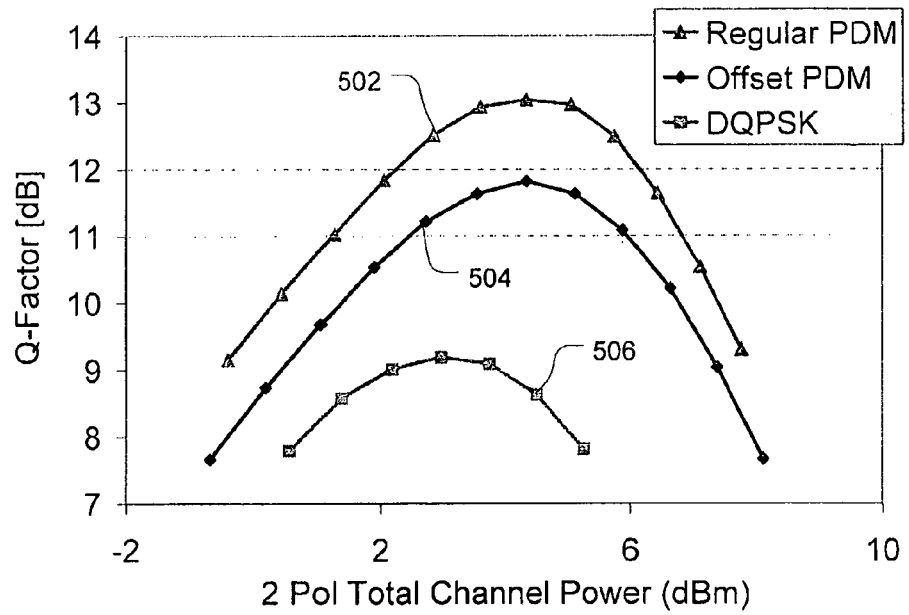
FIG. 5 includes plots of Q-factor vs. channel power illustrating transmission performance of an embodiment consistent with the present disclosure.
Figure 6:
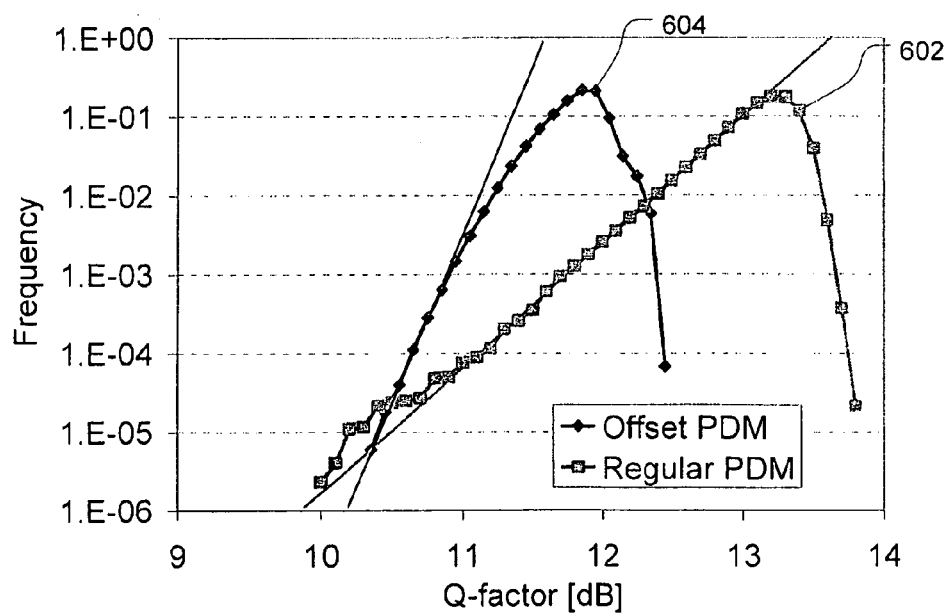
FIG. 6 includes histograms illustrating the frequency of measured Q-factors in an embodiment consistent with the present disclosure.

FIGS. 5 and 6 illustrate the performance of an exemplary system consistent with the present disclosure including 50 channels, each at 40 Gb/sec, transmitted over a 5,200 km Raman-assisted EDFA system with 150 km repeater spacing and 66.6 GHz channel spacing. FIG. 5 includes plots 502, 504, 506 of Q factor vs. total channel power for the test system using conventional POLMUX RZ-DPSK modulation, an offset POLMUX RZ-DPSK modulation consistent with the present disclosure, and a DQPSK modulation, respectively. As shown, an offset POLMUX RZ-DPSK system consistent with the present disclosure exhibits a similar nonlinear tolerance compared to conventional POLMUX-RZ-DPSK, without requiring a polarization controller and polarizer, and outperformed RZ-DQPSK by about 2.5 dB.

FIG. 6 includes histograms 602, 604 of the measured Q-factors for the test system using conventional POLMUX RZ-DPSK modulation and an offset POLMUX RZ-DPSK modulation consistent with the present disclosure, respectively. As shown, the worst-case Q-factor for an offset POLMUX RZ-DPSK system consistent with the present disclosure is about 0.3 dB higher than the worst-case Q-factor for a conventional POLMUX RZ-DPSK system. Also, the range of Q-factors for an offset POLMUX RZ-DPSK system consistent with the present disclosure is narrower than the range for a conventional POLMUX RZ-DPSK system.

Figure 7:
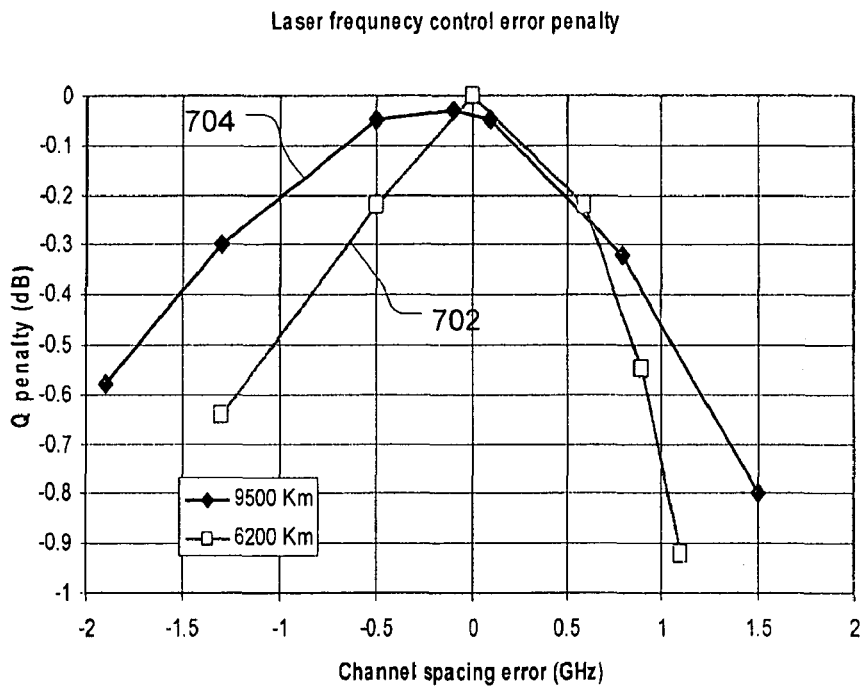
FIG. 7 includes plots of Q-penalty vs. channel spacing error illustrating tolerance of channel spacing of an embodiment consistent with the present disclosure.
Figure 8:
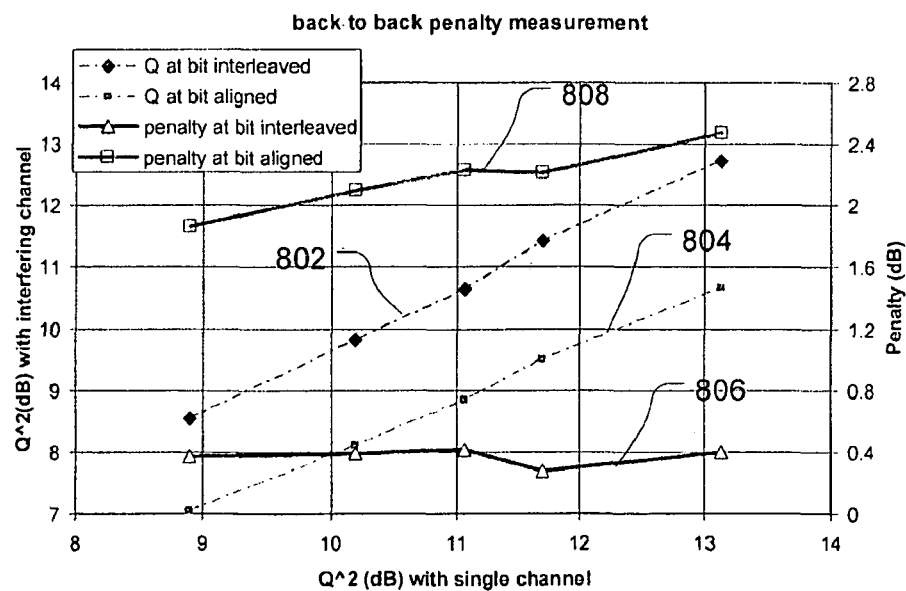
FIG. 8 includes plots of Q-factor of an embodiment consistent with the present disclosure compared to Q-factor of an embodiment with a single channel, and plots illustrating Q penalty with bit aligned channels and bit interleaved channels in an embodiment consistent with the present disclosure.

FIGS. 7-8 illustrate the performance of an exemplary test system consistent with the present disclosure including 40 Gb/sec channels transmitted over 6200 km and 9500 km and an offset POLMUX RZ-DPSK modulation. FIG. 7 includes plots 702, 704 of Q factor penalty (dB) vs. channel spacing error for 6200 km and 9500 km transmissions, respectively. The term "channel spacing error" in FIG. 7 refers to error in a desired spacing of one-quarter of the bit rate between, for example, $\lambda_{NA}$ and $\lambda_{NB}$. For a 40 Gb/sec signal, the signals modulated on $\lambda_{NA}$ and $\lambda_{NB}$ have a bit rate of 20 Gb/s, a spacing of one-quarter of the bit rate would be a 5 GHz spacing. A "channel spacing error" of 0 in FIG. 7 indicates that $\lambda_{NA}$ and $\lambda_{NB}$, for example, are separated by exactly one-quarter of the bit rate.

As shown, the test system consistent with the present disclosure exhibits less than a 0.2 dB transmission penalty at distances of 6200 km and 9500 km for a 0.5 GHz channel spacing error, and less than a 0.5 dB transmission penalty for a 1 GHz channel spacing error. In one embodiment, therefore, the channel spacing error may be less than or equal to 0.5 GHz for signals having a bit rate of 20 Gb/s. More generally, the channel spacing error may be less than or equal to 10% of the nominal (desired) channel spacing. In other words the frequency difference between $f_{NA}$ and $f_{NB}$ may be an odd number of a quarter of the bit rate±10%.

FIG. 8 includes plots 802, 804 of Q factor for a system consistent with the present disclosure, e.g. including first and second channels, $\lambda_{NA}$ and $\lambda_{NB}$, when the channels are bit-interleaved and bit aligned, respectively, compared to the Q factor of a system including only a single channel. FIG. 8 also includes plots 806, 808 of the Q penalty of a system consistent with the present disclosure when the channels are bit-interleaved and bit aligned, respectively, compared to the Q factor of a system including only a single channel. As illustrated by plot 806, bit-interleaving in the exemplary test system consistent with the present disclosure resulted in a Q penalty of less than 0.5 dB compared to the Q performance of a single channel.

According to one aspect of the disclosure there is thus provided an apparatus including: a driver configured to receive a data signal having an original data rate of 2 R Gb/s, and separate the data signal into first and second data signals, each of the first and second data signals having a data rate of R Gb/s; a first differential phase shift keying (DPSK) modulator for modulating the first data signal on a first optical signal with a DPSK data modulation to provide a first optical data signal, the first optical signal having a first carrier frequency; a second DPSK modulator for modulating the second data signal on a second optical signal with a DPSK data modulation to provide a second optical data signal, the second optical signal having a second carrier frequency, the absolute value of the difference between the first carrier frequency and the second carrier frequency being approximately an odd number of one-quarter of R GHz; a variable delay element coupled to the second DPSK demodulator configured for imparting a variable delay to the second optical data signal compared to first optical data signal; and a combiner coupled to an output of the first DPSK modulator and an output of the second DPSK modulator and configured for combining the first optical data signal and the second optical data signal into an aggregate signal for coupling to an optical information channel, the first optical data signal being relatively orthogonally polarized relative to the second optical data signal.

According to another aspect of the disclosure there is provided a method including: separating a data signal having a data rate of 2 R Gb/s into first and second data signals, each of the first and second data signals having a data rate of R Gb/s; modulating the first data signal on a first optical signal with a differential phase shift keying (DPSK) data modulation to provide a first optical data signal, the first optical signal having a first carrier frequency; modulating the second data signal on a second optical signal with a differential DPSK data modulation to provide a second optical data signal, the second optical signal having a second carrier frequency, the absolute value of the difference between the first carrier frequency and the second carrier frequency being approximately an odd number of one-quarter of R GHz; imparting a delay to the second optical data signal compared to first optical data signal; orthogonally polarizing the first and second optical signals relative to each other; and combining the first and second optical data signals into an aggregate signal for coupling to the optical information channel.

According to another aspect of the disclosure, there is provided an apparatus including: a demodulator configured for receiving a first optical signal having data modulated thereon according to a DPSK modulation format at a data rate of R Gb/s and a second optical signal having data modulated thereon according to a DPSK modulation format at a data rate of R Gb/s, the first optical signal having a first carrier frequency, the second optical signal having a second carrier frequency, the absolute value of the difference between the first carrier frequency and the second carrier frequency being approximately an odd number of one-quarter of R GHz, the demodulator having a center frequency approximately equal to the first carrier frequency and being configured to provide the first and second optical signals on first and second arms and provide first and second optical outputs; first and second photodetectors, the first photodetector being configured for providing a first electrical output in response to the first optical output being imparted thereon, the second photodetector being configured for providing a second electrical output in response to the second optical output being imparted thereon; and a differential amplifier coupled to the first and second electrical outputs.

According to another aspect of the disclosure, there is provided a method including receiving a first optical signal having data modulated thereon according to a DPSK modulation format at a data rate of R Gb/s and a second optical signal having data modulated thereon according to a DPSK modulation format at a data rate of R Gb/s, the first optical signal having a first carrier frequency, the second optical signal having a second carrier frequency, the absolute value of the difference between the first carrier frequency and the second carrier frequency being approximately an odd number of one-quarter of R GHz; coupling the first optical signal and the second optical signal to a demodulator having a center frequency approximately equal to the first carrier frequency and being configured to provide the first and second optical signals on first and second arms and provide first and second optical outputs; imparting the first and second optical outputs on first and second photodetectors, respectively, the first photodetector being configured for providing a first electrical output in response to the first optical output being imparted thereon, the second photodetector being configured for providing a second electrical output in response to the second optical output being imparted thereon; and coupling the first and second electrical outputs to a differential amplifier.

The embodiments that have been described herein but some of the several which utilize a system or method consistent with the present disclosure and are set forth herein by way of illustration but not of limitation. Many other embodiments, which will be readily apparent to those skilled in the art, may be made without departing materially from the spirit and scope of the disclosure.

What is claimed is:
1. An apparatus comprising:
a driver configured to receive a data signal having an original data rate of 2R Gb/s, and separate said data signal into first and second data signals, each of said first and second data signals having a data rate of R Gb/s;
a first differential phase shift keying (DPSK) modulator for modulating said first data signal on a first optical signal with a DPSK data modulation to provide a first optical data signal, said first optical signal having a first carrier frequency;

a second DPSK modulator for modulating said second data signal on a second optical signal with a DPSK data modulation to provide a second optical data signal, said second optical signal having a second carrier frequency, the absolute value of the difference between the first carrier frequency and the second carrier frequency being approximately an odd number of one-quarter of R GHz;

a variable delay element coupled to said second DPSK demodulator configured for imparting a variable delay to said second optical data signal compared to first optical data signal; and a combiner coupled to an output of said first DPSK modulator and an output of said second DPSK modulator and configured for combining said first optical data signal and said second optical data signal into an aggregate signal for coupling to an optical information channel, said first optical data signal being relatively orthogonally polarized relative to said second optical data signal.

2. An apparatus according to claim 1, wherein the absolute value of the difference between the first carrier frequency and the second carrier frequency is within 10% or less of an odd number of one-quarter of R GHz.

3. An apparatus according to claim 1, wherein the absolute value of the difference between the first carrier frequency and the second carrier frequency is within 10% or less of one-quarter of R GHz.

4. An apparatus according to claim 1, wherein said differential phase shift keying (DPSK) data modulation comprises a return-to-zero DPSK data modulation.

5. An apparatus according to claim 1, wherein said combiner comprises a polarization combiner.

6. An apparatus according to claim 1, said apparatus further comprising a power detector configured for detecting power in said aggregate signal and providing a feedback signal to said variable delay element for controlling said variable delay imparted by said delay element to provide bit-interleaving of said first and second optical data signals.

7. An apparatus according to claim 1, said apparatus further comprising:

a demodulator configured for receiving said aggregate signal, said demodulator having a center frequency approximately equal to said first carrier frequency and being configured to provide said aggregate signal on first and second arms and provide first and second optical outputs;

first and second photodetectors, said first photodetector being configured for providing a first electrical output in response to said first optical output being imparted thereon, said second photodetector being configured for providing a second electrical output in response to said second optical output being imparted thereon; and a differential amplifier coupled to said first and second electrical outputs.

8. An apparatus according to claim 7, said apparatus further comprising:

a second demodulator configured for receiving said aggregate signal, said second demodulator having a center frequency approximately equal to said second carrier frequency and being configured to provide aggregate signal on first and second arms of said second demodulator and provide third and fourth optical outputs;

third and fourth photodetectors, said third photodetector being configured for providing a third electrical output in response to said third optical output being imparted thereon, said fourth photodetector being configured for providing a fourth electrical output in response to said fourth optical output being imparted thereon; and a second differential amplifier coupled to said third and fourth electrical outputs.

9. An apparatus according to claim 8, said apparatus further comprising a time-division multiplexer coupled to an output of said first differential amplifier and an output of said second differential amplifier and configured for combining said output of said first differential amplifier and said output of said second differential amplifier modulator into a demodulated aggregate signal having a data rate of 2R Gb/s.

10. A method comprising:

separating a data signal having a data rate of 2R Gb/s into first and second data signals, each of said first and second data signals having a data rate of R Gb/s;

modulating said first data signal on a first optical signal with a differential phase shift keying (DPSK) data modulation to provide a first optical data signal, said first optical signal having a first carrier frequency;

modulating said second data signal on a second optical signal with a DPSK data modulation to provide a second optical data signal, said second optical data signal having a second carrier frequency, the absolute value of the difference between the first carrier frequency and the second carrier frequency being approximately an odd number of one-quarter of R GHz;

imparting a delay to said second optical data signal compared to first optical data signal;

orthogonally polarizing said first and second optical signals relative to each other; and combining said first and second optical data signals into an aggregate signal for coupling to said optical information channel.

11. A method according to claim 10, wherein the absolute value of the difference between the first carrier frequency and the second carrier frequency is within 10% or less of an odd number of one-quarter of R GHz.

12. A method according to claim 10, wherein the absolute value of the difference between the first carrier frequency and the second carrier frequency is within 10% or less of one-quarter of R GHz.

13. A method according to claim 10, wherein said differential phase shift keying (DPSK) data modulation comprises a return-to-zero DPSK data modulation.

14. A method according to claim 10, wherein said polarizing and combining comprises coupling said first and second optical data signals to a polarization combiner.

15. A method according to claim 10, said method further comprising detecting power in said aggregate signal and imparting said delay in response to said power in said aggregate signal to achieve bit-interleaving of said first and second optical data signals.

16. A method according to claim 10, said method further comprising:

receiving said aggregate signal;

coupling said aggregate signal to a demodulator having a center frequency approximately equal to said first carrier frequency and being configured to provide said aggregate signal on first and second arms and provide first and second optical outputs;

imparting said first and second optical outputs on first and second photodetectors, respectively, said first photodetector being configured for providing a first electrical output in response to said first optical output being imparted thereon, said second photodetector being configured for providing a second electrical output in response to said second optical output being imparted thereon; and coupling said first and second electrical outputs to a differential amplifier.

17. A method according to claim 16, said method further comprising:

coupling said aggregate signal to a second demodulator having a center frequency approximately equal to said second carrier frequency and being configured to provide said aggregate signal on first and second arms of said second demodulator and provide third and fourth optical outputs;

imparting said third and fourth optical outputs on third and fourth photodetectors, respectively, said third photodetector being configured for providing a third electrical output in response to said third optical output being imparted thereon, said fourth photodetector being configured for providing a fourth electrical output in response to said fourth optical output being imparted thereon; and coupling said third and fourth electrical outputs to a second differential amplifier.

18. A method according to claim 17, said method further comprising combining said output of said first differential amplifier and said output of said second differential amplifier modulator into a demodulated aggregate signal having a data rate of 2R Gb/s.

19. An apparatus comprising:

a demodulator configured for receiving a first optical signal having data modulated thereon according to a differential phase shift keying (DPSK) modulation format at a data rate of R Gb/s and a second optical signal having data modulated thereon according to a DPSK modulation format at a data rate of R Gb/s, said first optical signal having a first carrier frequency, said second optical signal having a second carrier frequency, the absolute value of the difference between the first carrier frequency and the second carrier frequency being approximately an odd number of one-quarter of R GHz, said demodulator having a center frequency approximately equal to said first carrier frequency and being configured to provide said first and second optical signals on first and second arms and provide first and second optical outputs;

first and second photodetectors, said first photodetector being configured for providing a first electrical output in response to said first optical output being imparted thereon, said second photodetector being configured for providing a second electrical output in response to said second optical output being imparted thereon; and a differential amplifier coupled to said first and second electrical outputs.

20. An apparatus according to claim 19, said apparatus further comprising:

a second demodulator configured for receiving said first and second optical signals, said second demodulator having a center frequency approximately equal to said second carrier frequency and being configured to provide said first and second optical signals on first and second arms of said second demodulator and provide third and fourth optical outputs;

third and fourth photodetectors, said third photodetector being configured for providing a third electrical output in response to said third optical output being imparted thereon, said fourth photodetector being configured for providing a fourth electrical output in response to said fourth optical output being imparted thereon; and a second differential amplifier coupled to said third and fourth electrical outputs.

21. An apparatus according to claim 20, said apparatus further comprising a time-division multiplexer coupled to an output of said first differential amplifier and an output of said second differential amplifier and configured for combining said output of said first differential amplifier and said output of said second differential amplifier modulator into an aggregate signal having a data rate of 2R Gb/s.

22. An apparatus according to claim 19, wherein said differential phase shift keying (DPSK) data modulation comprises a return-to-zero DPSK data modulation.

23. An apparatus according to claim 19, wherein the absolute value of the difference between the first carrier frequency and the second carrier frequency is within 10% or less of an odd number of one-quarter of R GHz.

24. An apparatus according to claim 19, wherein the absolute value of the difference between the first carrier frequency and the second carrier frequency is within 10% or less of one-quarter of R GHz.

25. A method comprising:

receiving a first optical signal having data modulated thereon according to a differential phase shift keying (DPSK) modulation format at a data rate of R Gb/s and a second optical signal having data modulated thereon according to a DPSK modulation format at a data rate of R Gb/s, said first optical signal having a first carrier frequency, said second optical signal having a second carrier frequency, the absolute value of the difference between the first carrier frequency and the second carrier frequency being approximately an odd number of one-quarter of R GHz;

coupling said first optical signal and said second optical signal to a demodulator having a center frequency approximately equal to said first carrier frequency and being configured to provide said first and second optical signals on first and second arms and provide first and second optical outputs;

imparting said first and second optical outputs on first and second photodetectors, respectively, said first photodetector being configured for providing a first electrical output in response to said first optical output being imparted thereon, said second photodetector being configured for providing a second electrical output in response to said second optical output being imparted thereon; and coupling said first and second electrical outputs to a differential amplifier.

* * * * *